(No Model.)

J. W. FORAN.
CLEAT.

No. 391,526. Patented Oct. 23, 1888.

WITNESSES:
J. D. Garfield.
C. Sedgwick.

INVENTOR,
J. W. Foran.
BY Munn & Co.
ATTORNEY.

UNITED STATES PATENT OFFICE.

JOHN W. FORAN, OF ST. JOHNS, NEWFOUNDLAND.

CLEAT.

SPECIFICATION forming part of Letters Patent No. 391,526, dated October 23, 1888.

Application filed June 13, 1888. Serial No. 276,957. (No model.)

*To all whom it may concern:*

Be it known that I, JOHN W. FORAN, of St. Johns, Newfoundland, have invented a new and useful Improvement in Cleats, of which the following is a full, clear, and exact description.

My invention relates to an improvement in cleats, and has for its object to provide a device especially adapted for use on shipboard, and more specially for use upon small crafts, wherein the sheet or rope secured upon said cleat may be cast off automatically by the action of the water or by the helmsman or other person adjacent to or at a distance from the cleat.

The invention consists in the construction and combination of the several parts, as will be hereinafter fully described, and pointed out in the claims.

Reference is to be had to the accompanying drawings, forming a part of this specification, in which similar figures of reference indicate corresponding parts in all the views.

Figure 1:
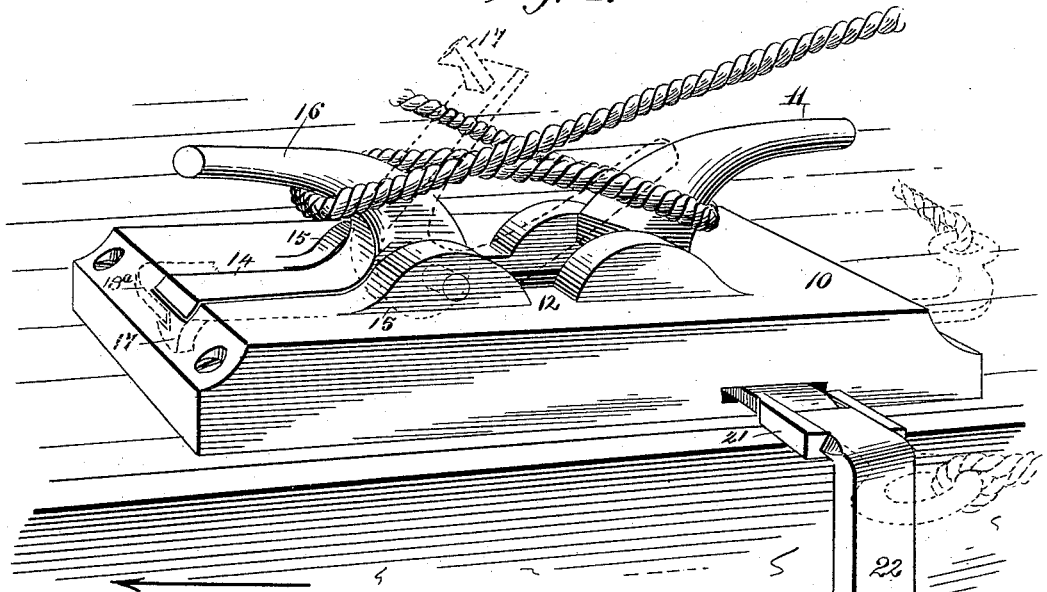
Figure 2:
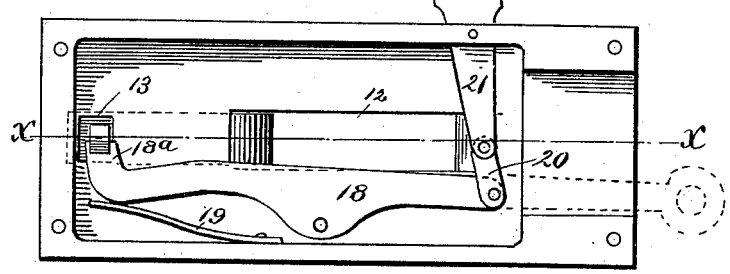
Figure 3:
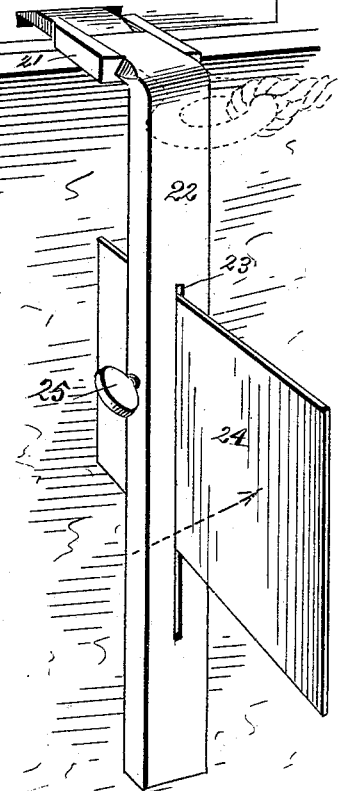
Figure 3:
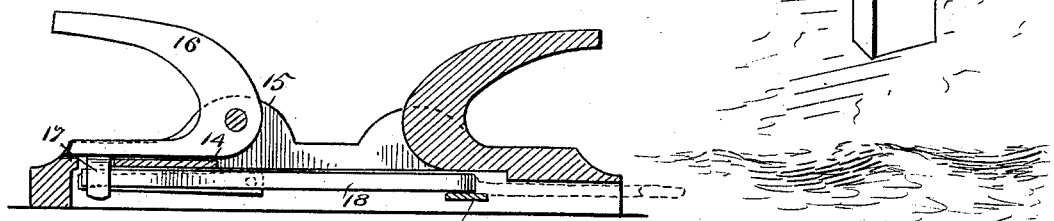

Figure 1 is a perspective view of the cleat, illustrated as applied to a vessel. Fig. 2 is a bottom plan view of the same, and Fig. 3 is a central longitudinal vertical section on line $x$ $x$ of Fig. 2.

The prime object of this invention is to provide a means whereby when a yacht or similar vessel keels over beyond a predetermined line upon the side the main sheet or other rope secured upon the cleat will be automatically released therefrom by the action of the water.

In carrying out the invention the base 10 of the cleat is provided upon its upper face, near one end, with a fixed or integral outwardly-extending horn or arm, 11, and a central slot, 12, extending in the direction of the opposite end from the base of said fixed arm, as best shown in Fig. 1. A preferably rectangular aperture, 13, is produced in the upper face at the end opposite to that upon which the arm 11 is fixed, and the upper face of said base between the aforesaid slot and aperture is provided with a recessed or countersunk surface, 14, as best shown in Fig. 3.

At one extremity of the central slot, 12, aligning ears 15 are produced, between which an angular arm, 16, is pivoted, the upper member of which arm is made to curve outward in similar manner to the fixed arm 11. The horizontal member of the said arm 16, which is adapted to normally rest upon the recessed surface 14, is provided at its extremity upon the under side with a downwardly-projecting lug, 17, having a latch-head, as best shown in Fig. 2, which lug is made to enter the aperture 13.

Upon the under side of the base, at one side of the slot 12, a lever, 18, is centrally pivoted, one end of which lever is provided with an extension, 18ª, which extension is at right angles to the body of the lever and adapted for engagement with the latch-head of the lug 17, as best shown in Fig. 2. The lever is retained in connection with the said latch-head by means of a spring, 19, secured to one side of the base, having a bearing upon the edge of the lever below the extension thereof. To the opposite end of the lever a link, 20, is pivoted, and to the end of said link a second lever, 21, is pivotally attached, which latter lever projects outward through a slot in the side of the base, having the sides of the outwardly-projecting portion bent upward to form a dovetail groove, as illustrated in Fig. 1.

In placing the device upon a vessel the same is usually secured upon the deck in any approved manner adjacent to the side of the craft, whereby the outwardly-extending end of the lever 21 projects a slight distance horizontally over said side. If the device is to be tripped automatically, an angular arm, 22, is slid in the dovetail groove of the lever 21, one member of which arm projects downward over the side, as illustrated in Fig. 1. In this projecting member a longitudinal slot, 23, is produced, which slot is adapted to receive a plate, 24, the latter being secured by means of a set-screw, 25. The slot 23 is made sufficiently long to admit of vertical adjustment of the said plate 24. Thus in operation, if it is desired that the boat should keel over upon the side a certain distance only, the plate 24 is secured to the arm 22, so that when the predetermined line is buried in the water the plate will come in contact with the water, and as the vessel is forging ahead the water striking that side of the plate facing the bow carries the plate rearward, whereupon the arm 22 is carried in the same direction, the lever 21 actuated, which lever, acting upon the lever 18, releases said lever from connection with the headed lug of the pivoted arm 16, permitting said arm to assume the position indicated by dotted lines in Fig. 1, whereby the sheet or rope coiled upon the cleat is instantly released.

If it be desired to release the main sheet—as, for instance, in a moment of danger—from the helm or other point, the arm 22 may be dispensed with and a rope adapted to lead aft may be attached in an aperture formed in the outer end of the lever 21, or an eye be produced at the extremity of said lever, as shown in dotted lines in Fig. 2.

I do not confine myself to the exact location of the tripping-lever 21, as, if it is found desirable, the said lever, instead of projecting from the side, as shown, may be made to project from the end, as illustrated in dotted lines in Figs. 1 and 3.

Having thus described my invention, what I claim as new, and desire to secure by Letters Patent, is—

1. In a cleat, the combination, with a base having a longitudinal slot and a rigid arm at one end of the said slot, of an angular arm pivoted at the end of the slot opposite the rigid arm and provided with a downwardly-projecting lug on its horizontal member, and a centrally-pivoted and spring-pressed lever having an inwardly-extending end engaging the lug of the horizontal member of the angular arm to hold the said arm in position, substantially as herein shown and described.

2. In a cleat, the combination, with a base provided with a central slot and an end aperture aligning said slot, an arm integral with the base at one end of the slot, and a second aligning arm pivoted to the base near the opposite end of said slot provided with a horizontal arm having a downwardly-projecting lug, of a lever pivoted beneath the base engaging the lug of the pivoted arm, a second lever projecting through the base connected with the first lever, an angle-arm detachably secured to the projecting lever, and a plate adjustable in said arm, as and for the purpose specified.

3. In a cleat, the combination, with a base provided with a central slot, an aperture at one end in alignment with said slot, a fixed arm adjacent to one end of the slot, and an angular arm pivoted near the opposite end of the slot having a downwardly-projecting lug adapted to enter the end aperture of the base, of a spring-actuated lever pivoted beneath the base having an end extension engaging the lug of the pivotal arm, a second lever projecting outward from the base linked to the first lever, and means, substantially as shown and described, for tripping the said outwardly-extending lever, as and for the purpose specified.

JOHN W. FORAN.

Witnesses:
J. F. ACKER, Jr.,
C. SEDGWICK.